United States Patent [19]

Bartholomew

[11] Patent Number: 4,915,136

[45] Date of Patent: Apr. 10, 1990

[54] STUFFER PLUG QUICK CONNECTOR ASSEMBLY

[75] Inventor: Donald D. Bartholomew, Marine City, Mich.

[73] Assignee: Proprietary Technology, Inc., Mt. Clemens, Mich.

[21] Appl. No.: 251,038

[22] Filed: Sep. 26, 1988

Related U.S. Application Data

[60] Continuation of Ser. No. 127,532, Dec. 2, 1987, abandoned, which is a continuation of Ser. No. 748,307, Jun. 24, 1985, abandoned, which is a division of Ser. No. 360,201, Mar. 22, 1982, Pat. No. 4,601,497, which is a division of Ser. No. 201,711, Oct. 29, 1980, Pat. No. 4,423,892.

[51] Int. Cl.$^4$ .............................................. F16L 35/00
[52] U.S. Cl. ......................................... 138/89; 29/235; 277/1; 277/9.5
[58] Field of Search ............... 138/89, 89.2, 89.4, 138/96 R, 96 T, 109, 113; 277/9.5, 11, 207 A; 29/700, 235, 270, 282

[56] References Cited

U.S. PATENT DOCUMENTS

| | | | |
|---|---|---|---|
| 730,378 | 6/1903 | Lambert | 138/89 X |
| 1,837,345 | 12/1931 | Thomas | 138/96 R |
| 1,976,589 | 10/1934 | Trickey | 277/11 |
| 3,780,773 | 12/1973 | Haugen | 138/89 |
| 4,136,885 | 1/1979 | Uhrner | 277/9.5 |
| 4,158,407 | 6/1979 | Rest | 138/96 R |
| 4,483,371 | 11/1984 | Susin | 138/89 X |
| 4,483,543 | 11/1984 | Fisher et al. | 277/207 A |

FOREIGN PATENT DOCUMENTS

| | | | |
|---|---|---|---|
| 881439 | 11/1981 | U.S.S.R. | 277/11 |
| 634848 | 3/1950 | United Kingdom | 277/9.5 |

Primary Examiner—James E. Bryant, III
Attorney, Agent, or Firm—Harness, Dickey, Pierce

[57] ABSTRACT

A quick connect assembly for use with tubular conduits is disclosed as comprising a housing having an axial bore for receiving one end of the conduit, an elastomeric ring-like seal is disposed in the bore for providing a fluid tight seal between confronting portions of the conduit and the housing, an annular bushing is disposed in the bore for positioning the seal and for guiding the one end of the conduit into nesting relationship with the bore, and a retainer is detachably secured to the housing and is cooperable with an annular projection on the conduit for securing the conduit in its operative position within the bore, the retainer having resilient deformable portions which are adapted to snap over the locking wall upon insertion of the conduit into the housing bore. A disposable stuffer plug is used to install the sealing and retaining elements in the axial bore of the housing.

7 Claims, 10 Drawing Sheets

STUFFER PLUG QUICK CONNECTOR ASSEMBLY

CROSS REFERENCE TO A RELATED APPLICATION

This is a continuation of U.S. patent application Ser. No. 127,532, filed Dec. 2, 1987, now abandoned entitled "A Swivelable Quick Connector Assembly," which is a continuation application Ser. No. 748,307, filed June 24, 1985, now abandoned which is a divisional application of Ser. No. 360,201, filed Mar. 22, 1982, now Patent No. 4,601,497, which is a continuation-in-part application of Ser. No. 201,711, filed Oct. 29, 1980, now Patent No. 4,423,892 all having the same title as above.

BACKGROUND AND SUMMARY OF THE INVENTION

The present invention relates to a connector assembly for providing a swivelable quick connection.

In the automotive industry, as well as for many other industries, the need always exists for low-cost, reliable, and easy to assemble components. This need is especially apparent with respect to providing a connection between fluid carrying conduits, such as a fuel or refrigerant lines. In older threaded connectors, substantial assembly time could be accumulated in screwing on a cap to a fitting and tightening the cap down to the proper torque needed to provide for a fluid tight seal. Further, an inventory would have to be maintained to keep track of the number of caps and fittings, and any liners or other components that may be necessary. Also, retightening of the caps may be required to maintain the seal after the automobile or other system has been put in use.

Accordingly, it is the primary object of the present invention to provide an improved connector assembly for providing a swivelable quick connection between fluid conveying conduits.

In addition, it is an object of the present invention to provide a pre-assembled connector housing and retainer element so that a connection to a tubular fluid conveying conduit may be made in one step without resorting to any tools.

Another object of the present invention is to provide a pre-assembled connector housing and retainer element so that a snapping connection may be made to a tubular fluid conveying conduit.

Another object of the present invention is to provide a connector assembly that may be employed to join dissimilar electrically conducting materials that would be otherwise subject to galvanic corrosion.

It is a further object of the present invention to provide a connector assembly which is adapted to provide for a bleed-down position when disconnecting a conduit from the housing of the connector assembly.

It is another object of the present invention to provide a pre-assembled connector conduit unit which requires only a one-step snapping connection to be joined to a connector housing.

It is yet another object of the present invention to provide a removable, disposable cover for protecting the pre-assembled connector conduit unit.

It is a further object of the present invention to provide a disposable stuffer-plug for the connector assembly which is adapted to install one or more sealing elements in an axial bore of the connector housing and detachably secure a retainer element to the connector housing, as well as to seal the axial bore of the connector housing.

To achieve the foregoing objects, the present invention provides a disposable stuffer-plug swivelable connector assembly which generally comprises a tubular conduit, a housing, sealing means, and retainer means. The tubular conduit is adapted to convey fluid and is formed with an annular projection disposed a predetermined distance from the end of the conduit to be connected. The housing is formed with an axial bore for receiving the conduit at a first end and for providing a fluid path at a second end, and includes an inwardly extending annular lip (or suitable apertures) at the first end to detachably secure the retainer means to the housing. The sealing means is disposed within the axial bore of the housing for providing a fluid tight seal between confronting portions of the conduit and the housing. The retainer means is adapted to be disposed generally within the axial bore of the housing for cooperating with the annular projection of the conduit to secure the conduit in its operative position within the axial bore of the housing. The retainer means includes three or more circumferentially spaced resilient deformable leg members which extend from an integral collar member at one end thereof. Each of the leg members has an outwardly opening channel portion which is adapted to receive the inwardly extending lip of the housing to secure the retainer means to the housing, and an inwardly opening channel portion adapted to receive the annular projection of the conduit for securing the conduit in its operative position within the axial bore of the housing. The ring from which the legs extend may additionally serve to position and retain the sealing means. The disposable stuffer-plug is adapted to install the sealing means or retainer means in the axial bore of the housing.

Additional objects and advantages of the present invention will become apparent from reading of the detailed description of the preferred embodiments which makes reference to the following set of drwings in which:

DETAILED DESCRIPTION OF THE PREFERRED EMBODIMENTS

Figure 1:
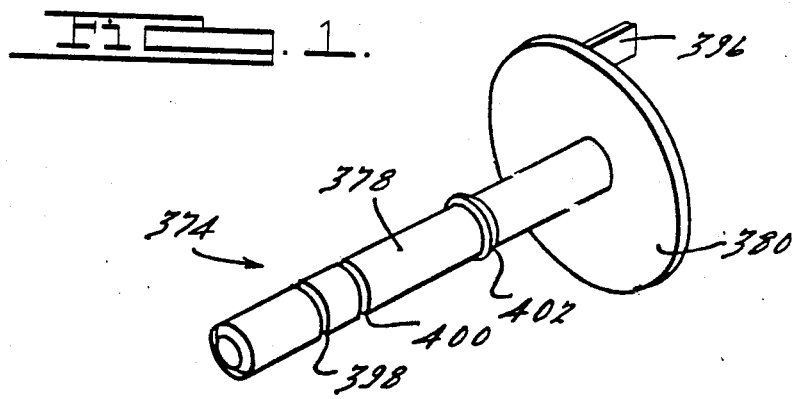
FIG. 1 is a perspective view of a stuffer-plug according to the present invention.

Referring to FIG. 1, a perspective view of a stuffer-plug 374 according to the present invention is shown. The stuffer-plug 374 is intended to be disposable and is preferably made from a plastic material. The stuffer-plug 374 serves three principal functions, which may best be illustrated with reference to FIG. 2. Briefly, the stuffer-plug 374 is used to install one or more sealing elements in the axial bore of a housing and detachably secure a retainer element to the housing. The stuffer-plug 374 also serves to seal the axial bore of the housing.

Figure 2:
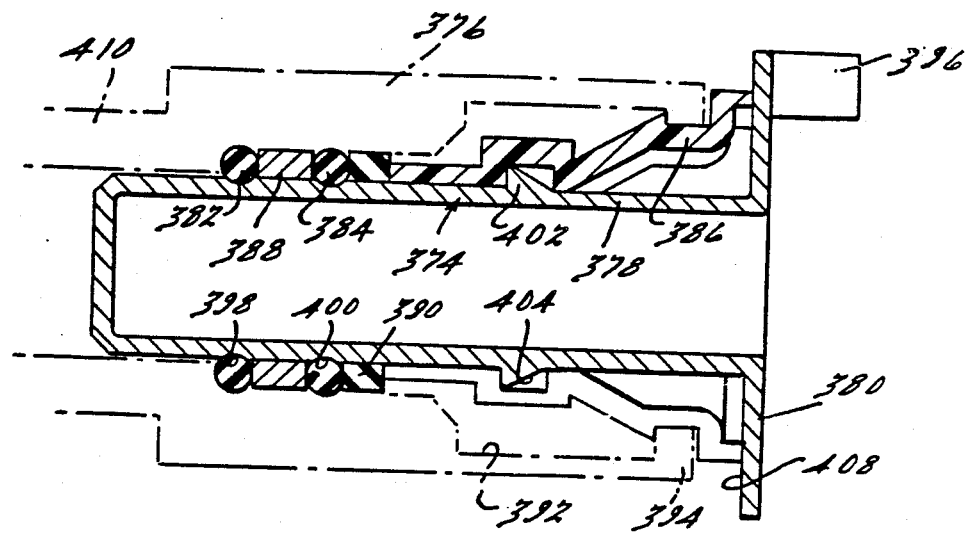
FIG. 2 is a side elevation view, partially in cross-section with the housing shown in phantom, of the stuffer-plug illustrated in FIG. 1 supporting the sealing and retainer elements.

FIG. 2 is a side elevation view of the stuffer-plug 374, partially in cross-section, shown to be disposed in a housing 376 (in phantom lines). The stuffer-plug 374 is comprised of a body which is formed with a rod-shaped portion 378 and a facing portion 380 extending generally from one end of the rod-shaped portion. The rod-shaped portion is adapted to support sealing elements 382 and 384, and a retainer element 386 in a generally coaxial assembly relationship thereon. The rod-shaped portion 378 may also be used to support a sleeve 388 and a bushing 390 in the appropriate application. The rod-shaped portion 378 is also adapted to be inserted into an axial bore 392 of the housing 376 and preferably has an outer diameter generally corresponding to that of the conduit to be connected to the housing. The rod-shaped portion may be either a solid rod or tubular in construction, provided that the tube is closed at some point in order to seal the axial bore 392.

The facing portion 380 of the stuffer-plug body is adapted to cover or substantially cover the axial bore 392 of the housing 376 at a first end 394 thereof. In one form of the present invention, the facing portion 380 is a circular plate extending generally transversely from the rod-shaped portion 378, and the facing portion is formed with a generally axially extending tab 396 for facilitating the removal of the stuffer-plug 374 from the axial bore 392 of the housing 372. The rod-shaped portion 378 is also formed with two annular grooves 398 and 400 which seat the elastomeric ring sealing elements 382 and 384 respectively. The annular grooves 398 and 400 provide positioning means for maintaining the sealing elements 382 and 384 and the retainer element 386 in the assembly relationship on the stuffer-plug body until the stuffer-plug body is removed from the axial bore 392 of the housing 376. The annular grooves 398 and 400 operate to prevent the sealing and retainer elements from slipping off the stuffer-plug body before the rod-shaped portion 378 is inserted into the axial bore 392 of the housing, and yet also permits the sealing and retainer elements to slide off the rod-shaped portion when the stuffer-plug body is removed from the housing. It should be noted that it may only be necessary to provide for one annular groove in the rod-shaped portion 378, or provide for one or more annular projections instead of the annular grooves in the appropriate application. The rod-shaped portion 378 may also include an annular projection 402 formed with an inclined surface 404 for cooperating with the retainer element 386 to prevent the retainer element from slipping off the stuffer-plug body before the rod-shaped portion is inserted into the axial bore of the housing. The inclined surface 404 operates to facilitate the removal of the stuffer-plug body from the axial bore 392 of the housing 376 by causing a gradual outward deflection of the retainer element leg members as the stuffer-plug body is pulled out of the axial bore until the inwardly opening channel portion 406 of the retainer element leg members clears the annular projection 402.

The sealing elements 382–384 and the retainer element 386 are positioned adjacent to the opposite end of the retainer element. Accordingly, the facing portion 380 will provide a blocking surface 408 upon which the retainer element 386 is adapted to bear against when the stuffer-plug body is inserted into the axial bore 392 of the housing. Thus, when the rod-shaped portion 378 is inserted into the axial bore 392 of the housing 376, the sealing elements 382–384 and the retainer element 386 will be carried with the rod-shaped portion until the retainer element is detachably secured to the housing. It should be appreciated that once the rod-shaped portion 378 is in its operative position within the axial bore 392 of the housing (as shown in FIG. 2), the sealing elements 382–384 will operate to provide a fluid tight seal between confronting portions of the rod-shaped portion and the housing. In this position, the housing 376 or the device to which the housing is mounted is prepared for shipment and subsequent connection to a conduit. Additionally, in order to connect the conduit to the housing 376, the operator simply withdraws the stuffer-plug 374 from the housing and inserts the conduit in its place. Until that time, the stuffer-plug 374 will seal the axial bore 392 of the housing 376 from dirt or other environmental contamination.

It should be noted that with the sealing elements 382–384 and the retainer element 386 disposed on the rod-shaped portion of the stuffer-plug body in an assembled relationship, this combination of components forms a preassembled stuffer-plug unit for insertion into the axial bore of a housing. It may also be pointed out with reference to FIG. 2 that the housing 376 is not provided with external threads at the second end 410 thereof. This is to illustrate that the housing 376 may form part of an integral cast body, such as an engine block for example.

While the above description constitutes the preferred embodiments of the present invention, it will be appreciated that the invention is susceptible to modification, variation and change without departing from the proper scope and fair meaning of the accompanying claims.

I claim:

1. In combination with a connector assembly comprising; a tubular conduit adapted to convey fluid and formed with an annular projection disposed a predetermined distance from the end of the conduit to be connected, a housing formed with an axial bore for receiving the conduit at a first end and for providing a fluid path at a second end, sealing means for providing a fluid tight seal between confronting portions of the conduit and the housing, a retainer element including at least one relatively deformable portion extending substantially parallel to the axis of the conduit, at least one relatively non-axially deformable portion extending between the axially outerside of the annular projection of said conduit and a radially-extending surface of the housing and thereby maintaining the retainer element within the axial bore and preventing withdrawal of the conduit from the housing, and the relatively deformable portion of the retainer element being sufficiently long and deformable to allow sufficient radial movement of said relatively non-axially deformable portion to permit the non-axially deformable portion to be biased radially outwardly by the annular projection of the conduit as the conduit is inserted into the axial bore, and to cause the relatively non-axially deformable portion to snap radially inwardly adjacent the axially outer side of the annular projection when the conduit is positioned in place within the axial bore; the improvement comprising:

a disposable stuffer-plug adapted to install the sealing means in the axial bore of the housing and detachably secure the retainer element to the housing generally at the first end thereof and said stuffer-plug being removable from the housing to enable connection of the conduit, the conduit coupled with the sealing means and retainer element positioned in the housing by said stuffer-plug, said stuffer-plug having a body formed with a rod-shaped portion adapted to support the sealing means and the retainer element in a generally coaxial assembly relationship thereon and be inserted into the axial bore of the housing to seal the axial bore, and means disposed adjacent one end of said rod-shaped portion for allowing withdrawal of said rod-shaped portion from the axial bore of the housing, said rod-shaped portion being formed with positioning means for maintaining the sealing means and the retainer element in said assembly relationship on said body until said stuffer-plug body is removed from the axial bore of the housing, and said rod-shaped portion including means forming an inclined surface spaced axially between said positioning means and said withdrawing means for cooperating with the retainer element to prevent the retainer element from slipping off said body before said rod-shaped portion is inserted into the axial bore of the housing and for facilitating removal of said body from the axial bore of said housing by causing a gradual outward deflection of said non-axially deformable portion as said body is pulled out of the axial bore of the housing.

2. The disposible stuffer-plug as set forth in claim 1, wherein said withdrawing means comprises a facing portion extending generally from one end of said rod-shaped portion and adapted to substantially cover said axial bore of said housing.

3. The disposable stuffer-plug as set forth in claim 1, wherein said positioning means comprises at least one annular groove adapted to seat said sealing means.

4. The disposable stuffer-plug as set forth in claim 1 wherein said positioning means comprises an annular reduced diameter portion adapted to seat said sealing means.

5. The disposable stuffer-plug as set forth in claim 1, wherein said inclined means comprises an annular projection formed with at least one said inclined surface for cooperating with said retainer element.

6. The disposable stuffer-plug as set forth in claim 1, wherein said disposable stuffer-plug is made from a plastic material.

7. The disposable stuffer-plug as set forth in claim 1 wherein said inclined means comprises a ramp like surface extending radially inwardly toward one end of said rod-shaped portion.

* * * * *

UNITED STATES PATENT AND TRADEMARK OFFICE
CERTIFICATE OF CORRECTION

PATENT NO. : 4,915,136
DATED : April 10, 1990
INVENTOR(S) : Donald D. Bartholomew It is certified that error appears in the above-identified patent and that said Letters Patent is hereby corrected as shown below:

Title Page, under "U.S. Patent Documents", "Fisher et al." should be --Fisher, Jr. et al.--;

Col. 1, Line 26, "lines" should be --line--;

Col. 2, Line 35, "or" should be --and--;

Col. 2, Line 38, after "from", insert --a--;

Col. 2, Line 40, "drwings" should be --drawings--;

Col. 3, Line 54, after "are", insert --preferably disposed on the rod-shaped portion 378 in the assembly relationship such that one end of the retainer element is positioned adjacent to the facing portion 380 and the sealing elements 382 - 384 are--;

Col. 5, Line 20, "disposible" should be --disposable--.

Signed and Sealed this

Seventh Day of July, 1992

*Attest:*

DOUGLAS B. COMER

*Attesting Officer*   *Acting Commissioner of Patents and Trademarks*